United States Patent
Yasuda et al.

(10) Patent No.: US 12,168,724 B2
(45) Date of Patent: Dec. 17, 2024

(54) SILICONE RUBBER MOLDED BODY AND PRODUCTION METHOD FOR THE SAME

(71) Applicants: MITSUBISHI CABLE INDUSTRIES, LTD., Tokyo (JP); MITSUBISHI MATERIALS ELECTRONIC CHEMICALS CO., LTD., Akita (JP)

(72) Inventors: Hiroaki Yasuda, Amagasaki (JP); Takehiro Hamamura, Amagasaki (JP); Susumu Yonezawa, Fukui (JP); Jae-Ho Kim, Fukui (JP); Fumihiro Nishimura, Fukui (JP); Mitsuo Kurumaya, Akita (JP); Takeshi Kamiya, Akita (JP); Tsunetoshi Honda, Akita (JP)

(73) Assignee: MITSUBISHI CABLE INDUSTRIES, LTD., Tokyo (JP)

(*) Notice: Subject to any disclaimer, the term of this patent is extended or adjusted under 35 U.S.C. 154(b) by 310 days.

(21) Appl. No.: 17/255,771

(22) PCT Filed: Jun. 6, 2019

(86) PCT No.: PCT/JP2019/022573
§ 371 (c)(1),
(2) Date: Dec. 23, 2020

(87) PCT Pub. No.: WO2020/003961
PCT Pub. Date: Jan. 2, 2020

(65) Prior Publication Data
US 2021/0269610 A1 Sep. 2, 2021

(30) Foreign Application Priority Data
Jun. 25, 2018 (JP) .................... 2018-119422

(51) Int. Cl.
*C08J 7/12* (2006.01)
*C08G 77/385* (2006.01)
*C08J 7/02* (2006.01)

(52) U.S. Cl.
CPC ............ *C08J 7/126* (2013.01); *C08G 77/385* (2013.01); *C08J 7/02* (2013.01); *C08J 2383/04* (2013.01); *C08J 2383/08* (2013.01)

(58) Field of Classification Search
CPC ...... C08G 77/385; C08J 7/126; H01L 23/296; H01L 33/56

USPC ........................................................ 257/791
See application file for complete search history.

(56) References Cited

U.S. PATENT DOCUMENTS

| | | | |
|---|---|---|---|
| 6,136,386 A | 10/2000 | Nakahigashi et al. | |
| 2005/0028931 A1 | 2/2005 | Fukaya et al. | |
| 2005/0221734 A1 | 10/2005 | Zuniga et al. | |
| 2009/0176445 A1 | 7/2009 | Spiegel | |
| 2015/0303359 A1* | 10/2015 | Liu | H01L 33/507 438/27 |
| 2017/0306120 A1* | 10/2017 | McMillan | H01L 33/56 |
| 2019/0148589 A1* | 5/2019 | Yamada | H01L 33/56 257/100 |

FOREIGN PATENT DOCUMENTS

| | | | |
|---|---|---|---|
| CN | 104356418 A * | 2/2015 | |
| JP | S64-066245 A | 3/1989 | |
| JP | H2-64109 A | 3/1990 | |
| JP | 2005-199380 A | 7/2005 | |
| JP | 2005-325176 A | 11/2005 | |
| JP | 2006-036848 A | 2/2006 | |
| JP | 3791060 B2 | 6/2006 | |
| JP | 4086722 B2 | 5/2008 | |
| JP | 2013-239937 A | 11/2013 | |
| JP | 2014-192969 A | 10/2014 | |
| JP | 2016-079314 A | 5/2016 | |
| JP | 2016-126923 A | 7/2016 | |
| TW | 200940251 A1 | 1/2009 | |
| WO | WO 2018/003228 A1 * | 4/2018 | |

OTHER PUBLICATIONS

"Resistance to Corona Discharge of HTV Silicone Rubber Surface Layers Fluorinated at Different Temperatures" authored by An et al. and published in IEEE Transactions on Dielectrics and Electrical Insulation (2018) 25(2) 729-740.*
Lecture materials on partial pressures from the University of Illinois (no date) obtainable at http://www.chem.uiuc.edu/rogers/Text9/Tx96/tx96.html#:~:text=FIGURE%209.11%20The%20total%20pressure,pressure%20in%20the%20total%20pressure.*
Machine translation of CN 104356418 (no date).*

* cited by examiner

*Primary Examiner* — Marc S Zimmer
(74) *Attorney, Agent, or Firm* — KNOBBE MARTENS OLSON & BEAR LLP

(57) ABSTRACT

A silicone rubber molded body (10) has an article contact surface (11). The article contact surface (11) has a coefficient of rolling resistance lowered by a fluorination treatment on the article contact surface (11).

7 Claims, 1 Drawing Sheet

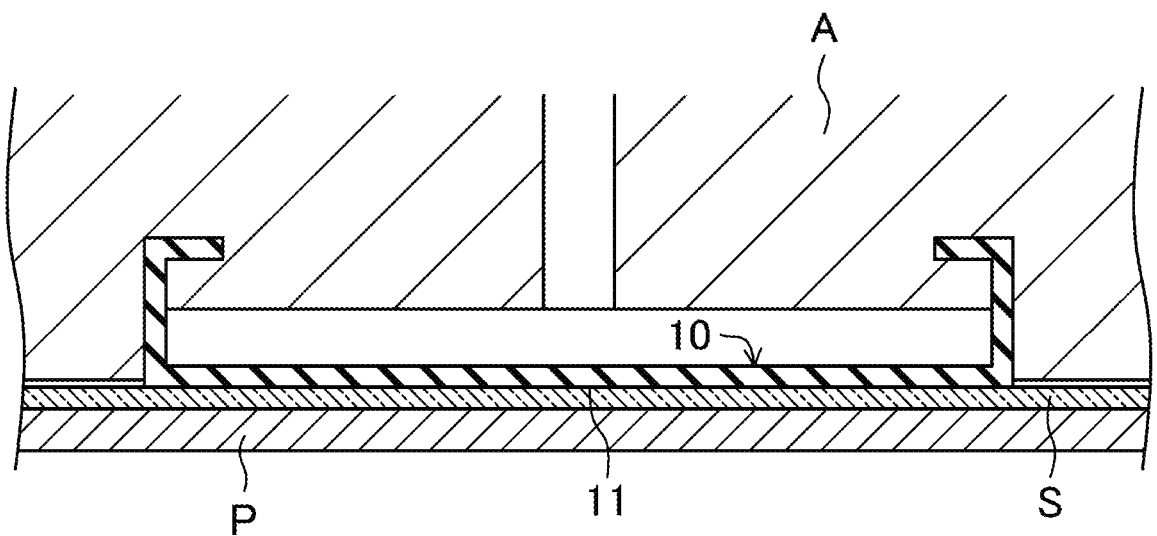

SILICONE RUBBER MOLDED BODY AND PRODUCTION METHOD FOR THE SAME

CROSS-REFERENCE TO RELATED APPLICATIONS

This application is the U.S. National Phase under 35. U.S.C. § 371 of International Application PCT/JP2019/022573, filed Jun. 6, 2019, which claims priority to Japanese Patent Application No. 2018-119422, filed Jun. 25, 2018. The disclosures of the above-described applications are hereby incorporated by reference in their entirety.

TECHNICAL FIELD

The present invention relates to a silicone rubber molded body and a method for producing the same.

BACKGROUND ART

The surface of silicone rubber generally has adhesiveness. For example, a chemical mechanical polishing apparatus (hereinafter, referred to as a "CMP apparatus") adsorbs and retains a wafer by an elastic film, and presses the wafer against a polishing pad to polish the wafer. If this elastic film is a silicone rubber molded body, the following problem arises: the wafer adheres to and cannot be released from the elastic film due to the adhesiveness of the silicone rubber, and an attempt to forcedly peel the wafer may cause damage to the wafer. If a pad of an article grip in a robot arm is a silicone rubber molded body, the following problem arises: when a gripped article is tried to be placed at a desired location, the article adheres to and cannot be released from the pad due to the adhesiveness of the silicone rubber, and this may fail to place the article to the desired location. Further, if a case of a portable electronic device is a silicone rubber molded body, the following problem arises: gripping of the case causes unpleasant feeling to touch due to the adhesiveness of the silicon rubber.

In order to solve these problems, it has been proposed to reduce the adhesiveness by coating an article contact surface of the silicone rubber molded body (e.g., Patent Documents 1 to 4).

CITATION LIST

Patent Documents

Patent Document 1: U.S. Patent Application Publication No. 2005/0221734
Patent Document 2: Japanese Patent No. 4086722
Patent Document 3: Japanese Patent No. 3791060
Patent Document 4: Japanese Unexamined Patent Publication No. H2-64109

SUMMARY OF THE INVENTION

The present invention is directed to a silicone rubber molded body having an article contact surface. The article contact surface has a coefficient of rolling resistance lowered by a fluorination treatment thereon.

The present invention is further directed to a method for producing the silicone rubber molded body of the present invention, the method including: performing a fluorination treatment of bringing an article contact surface of a silicone rubber-made, surface-untreated molded body into contact with a surface treating gas containing a fluorine gas with a partial pressure of 3.00 kPa or more.

BRIEF DESCRIPTION OF THE DRAWINGS

FIG. 1 is a cross-sectional view illustrating an elastic film according to an embodiment, the elastic film being for retaining a wafer in a CMP apparatus.

DESCRIPTION OF EMBODIMENT

An embodiment will be described in detail below.

FIG. 1 illustrates an elastic film 10 (silicone rubber molded body) according to the embodiment, the elastic film 10 being for retaining a wafer in an CMP apparatus A. The elastic film 10 according to this embodiment is configured such that the elastic film 10 is attached to a CMP apparatus A so as to expose a wafer retaining surface 11 (article contact surface) to an outside, that the wafer retaining surface 11 adsorbs and retains a wafer S (article), and that the wafer S is polished by contacting with a polishing pad P at a uniform pressure.

The elastic film 10 according to the embodiment is a silicone rubber-made molded body made of a crosslinked silicone rubber. Examples of the silicone rubber include a (meth)acryloyloxy group-containing polysiloxane, vinyl polysiloxane, and a mercaptoalkyl group-containing polysiloxane. Suitably, as the silicone rubber, one of them is used, or two or more of them are used. The crosslinking of the silicone rubber may be achieved by any of using organic peroxide, performing condensation polymerization, and using a platinum catalyst.

The elastic film 10 according to the present embodiment has a wafer retaining surface 11 that has undergone a fluorination treatment. Specifically, the wafer retaining surface 11 has a Si—F bond introduced.

The wafer retaining surface 11 has a coefficient of rolling resistance lowered by a fluorination treatment thereon. Specifically, the silicone rubber having a wafer retaining surface 11 that has undergone a fluorination treatment, and that has a Si—F bond introduced has a coefficient of rolling resistance lower than the silicone rubber having a wafer retaining surface 11 before the fluorination treatment.

When the silicone rubber is coated to reduce its adhesiveness, a problem with the coating layer peeling off and creating foreign matters arises. The inventors of the present invention found that the coefficient of rolling resistance lowers when the surface of the silicone rubber undergoes a fluorination treatment, thereby allowing the adhesion of the silicone rubber to an article to be reduced. In the elastic film 10 according to the embodiment based on this finding, the wafer retaining surface 11 has a coefficient of rolling resistance lowered by a fluorination treatment thereon. This can reduce adhesion of the wafer S and avoid generation of foreign matters caused by peeling off of the coating layer as in the case of the coating treatment.

The wafer retaining surface 11 that has undergone a fluorination treatment has a coefficient of rolling resistance of suitably 0.040 or less, more suitably 0.030 or less, yet more suitably 0.020 or less. A reduction rate represented by a percentage of the difference between the coefficients of rolling resistance before and after the fluorination treatment, to the coefficient of rolling resistance before the fluorination treatment is suitably 20% or more, more suitably 40% or more, yet more suitably 60% or more. The coefficient of rolling resistance herein is calculated as follows. First, a measurement surface of a test piece is cleaned with methanol and is then left in an atmosphere at a temperature of 20° C. and a humidity of 40% for 24 hours or more. Thereafter, a SUS304-made rolling probe having a smooth outer circumferential surface with a diameter of 30 mm is pressed against the measurement surface in the same atmosphere so as to apply a load of 1000 g while rolling the probe at a moving speed of 2000 mm/min. A rolling resistance during the steady state at this time is divided by the load to obtain a coefficient of rolling resistance.

Suitably, the wafer retaining surface 11 has a coefficient of static friction raised by the fluorination treatment thereon. Specifically, the silicone rubber having a wafer retaining surface 11 that has undergone a fluorination treatment and that has a Si—F bond introduced has a coefficient of static friction higher than the silicone rubber having a wafer retaining surface 11 before the fluorination treatment. In this manner, the wafer retaining surface 11 has a coefficient of static friction raised by the fluorination treatment thereon, thereby obtaining a high grip performance for the wafer S and allowing a reduction in spinning out of control of the wafer S when polished.

The wafer retaining surface 11 that has undergone a fluorination treatment has a coefficient of static friction of suitably 0.75 or more, more suitably 1.00 or more, yet more suitably 1.25 or more, and suitably 2.00 or less. An increase rate represented by a percentage of the difference between the coefficients of static friction before and after the fluorination treatment, to the coefficient of static friction before the fluorination treatment is suitably 60% or more, more suitably 100% or more, yet more suitably 150% or more. The coefficient of static friction herein is calculated as follows. First, a measurement surface of a test piece is cleaned with methanol and is then left in an atmosphere at a temperature of 20° C. and a humidity of 40% for 24 hours or more. Thereafter, a hemispherical tip with a diameter of 10 mm of a SUS304-made probe is pressed against the measurement surface in the same atmosphere so as to apply a load of 100 g while sliding the hemispherical tip at a moving speed of 75 mm/min. A peak value of a frictional resistance immediately after the start of moving the hemispherical tip is divided by the load to obtain a coefficient of static friction.

The contact angle (wettability) of the wafer retaining surface 11 is suitably 100° or more, more suitably 110° or more, for reducing adhesion of slurry used in polishing. This contact angle (wettability) is measured based on a half-angle (θ/2) method when a measurement surface is cleaned with methanol and is then left in an atmosphere at a temperature of 20° C. and a humidity of 40% for 24 hours or more, and thereafter, droplets of distilled water are applied on the measurement surface in the same atmosphere.

An increase in hardness of the wafer retaining surface 11 before and after the fluorination treatment is suitably A10 or less, more suitably A8 or less for avoiding a decrease in pressure dispersibility. The hardness is measured with a type A durometer. This hardness is measured in accordance with JIS K 6253-3:2012.

Now, a method for producing an elastic film 10 according to the embodiment will be described.

In the method for producing the elastic film 10 according to the embodiment, first, a silicone rubber-made, surface-untreated elastic film (surface-untreated molded body) was produced, and a wafer retaining surface thereof then underwent a fluorination treatment of bringing the wafer retaining surface into contact with a surface treating gas containing a fluorine gas with a partial pressure of 3.00 kPa or more.

The surface-untreated elastic film can be produced from an uncrosslinked silicone rubber material by, for example, press molding or injection molding. The surface-untreated elastic film can undergo a fluorination treatment typically by placing the surface-untreated elastic film in a chamber, hermetically sealing the chamber, then filling the chamber with a surface treating gas to expose the surface-untreated elastic film to the surface treating gas.

At this time, a treatment temperature during the fluorination treatment is suitably 0° C. or more to 100° C. or less, more suitably 10° C. or more to 50° C. or less, for lowering the coefficient of rolling resistance of the wafer retaining surface 11 and reducing the treatment time to enhance productivity. The treatment pressure (total pressure) is suitably 3 kPa or more to 200 kPa or less, more suitably 3 kPa or more to 110 kPa or less, for the same purposes. The partial pressure of the fluorine gas is 3.00 kPa or more, and is suitably 3.00 kPa or more to 20.0 kPa or less, more suitably 3.00 kPa or more to 10.0 kPa or less, for the same purposes. The treatment time is suitably 1 minute or more to 60 minutes or less, more suitably 1 minute or more to 10 minutes or less, for reducing the treatment time to enhance productivity.

The surface treating gas may have a content of the fluorine gas of 100 vol %, i.e., may consist of a fluorine gas alone. Alternatively, the surface treating gas may contain one or more kinds of other gas in addition to the fluorine gas. Examples of the other gas than the fluorine gas include an inactive gas such as a nitrogen gas and argon. In this case, the surface treating gas suitably contains a nitrogen gas for versatility. Further, the surface treating gas suitably contains no oxygen gas, for raising the coefficient of static friction and lowering the coefficient of rolling resistance of the wafer retaining surface 11. The content of the fluorine gas in the surface treating gas is suitably 10 vol % or more, more suitably 20 vol % or more, yet more suitably 30 vol % or more, for raising the coefficient of static friction and lowering the coefficient of rolling resistance of the wafer retaining surface 11.

The embodiment shows, as a non-limiting example of the silicone rubber molded body, the elastic film 10 for retaining a wafer in a CMP apparatus, but the silicone rubber molded body may be any of other substances. For example, when the silicone rubber molded body used in the embodiment forms a pad of an article grip in the robot arm, adhesion of the article can be reduced without generating foreign matters, thereby allowing the gripped article to be released at a desired position. In addition, when the silicone rubber molded body has a coefficient of static friction raised by the fluorination treatment, a high grip performance to the article can be obtained. Further, when the silicone rubber molded body used in the embodiment forms a case (casing or a protective case) of a portable electronic device such as a mobile phone and a tablet device, adhesion of the article can be reduced without generating foreign matters, thereby allowing unpleasant feeling to touch at the time of grabbing the case of the silicone rubber molded body into which the portable electronic device has been put to be reduced. In addition, when the silicone rubber molded body has a coefficient of static friction raised by the fluorination treatment, the case of the silicone rubber molded body into which the portable electronic device has been put can be grabbed tightly, thereby allowing the chance of slipping to be reduced.

EXAMPLES (Rubber Sheet)

Rubber sheets of Examples 1 and 2 and Comparative Examples 1 to 4 were produced.

Example 1

A silicone rubber sheet having a length of 100 mm, a width of 50 mm, and a thickness of 2 mm was produced by press molding, and a surface of the silicone rubber sheet then underwent a fluorination treatment, thereby producing a rubber sheet of Example 1. The fluorination treatment was performed at a treatment temperature of 25° C. and a treatment pressure (total pressure) of 22.0 kPa for a treatment time of 10 minutes. As a surface treating gas, a mixed gas of 30 vol % fluorine gas and 70 vol % nitrogen gas was used. Accordingly, the partial pressure of the fluorine gas was 6.60 kPa.

Example 2

A rubber sheet of Example 2 was produced in the same manner as in Example 1 except that 100 vol % fluorine gas was used alone as the surface treating gas, and that the treatment pressure (total pressure), i.e., the partial pressure of the fluorine gas was 6.67 kPa.

Comparative Example 1

A rubber sheet of Comparative Example 1 was produced in the same manner as in Example 1 except that the fluorination treatment was not performed.

Comparative Example 2

A rubber sheet of Comparative Example 2 was produced in the same manner as in Example 1 except that the surface of the silicone rubber sheet was provided with a parylene coating layer as a substitute for undergoing the fluorination treatment.

Comparative Example 3

A rubber sheet of Comparative Example 3 was produced in the same manner as in example 1 except that the surface of the silicone rubber sheet was provided with a DLC coating layer as a substitute for undergoing the fluorination treatment.

Comparative Example 4

A rubber sheet of Comparative Example 4 was produced in the same manner as in Example 1 except that the surface of the silicone rubber sheet was provided with a fluororesin coating layer as a substitute for undergoing the fluorination treatment.

(Test Method)

<Coefficient of Rolling Resistance>

For the rubber sheets of Examples 1 and 2 and Comparative Examples 1 to 4, their surfaces were cleaned with methanol; the rubber sheets were then left in an atmosphere at a temperature of 20° C. and a humidity of 40% for 24 hours; and thereafter, a SUS304-made rolling probe having a smooth outer circumferential surface with a diameter of 30 mm was pressed against the cleaned surfaces in the same atmosphere so as to apply the load of 1000 g while rolling the probe at a moving speed of 2000 mm/min. Then, each coefficient of rolling resistance was calculated by dividing a rolling resistance during the steady state by the load. The rolling resistance was measured with Heidon Type 14, which is a surface property tester manufactured by SHINTO Scientific Co., Ltd.

<Coefficient of Static Friction>

For the rubber sheets of Examples 1 and 2 and Comparative Examples 1 to 4, their surfaces were cleaned with methanol; the rubber sheets were then left in an atmosphere at a temperature of 20° C. and a humidity of 40% for 24 hours; and thereafter, a hemispherical tip with a diameter of 10 mm of a SUS304-made probe was pressed against the cleaned surfaces in the same atmosphere so as to apply the load of 100 g while sliding the hemispherical tip at a moving speed of 75 mm/min. Then, each coefficient of static friction was calculated by dividing a peak value of a frictional resistance immediately after the start of the movement by the load. The frictional resistance was measured with Heidon Type 14, which is a surface property tester manufactured by SHINTO Scientific Co., Ltd.

<Contact Angle (Wettability)>

For the rubber sheets of Examples 1 and 2 and Comparative Examples 1 to 4, their surfaces were cleaned with methanol; the rubber sheets were then left in an atmosphere at a temperature of 20° C. and a humidity of 40% for 24 hours; and thereafter, droplets of distilled water were applied on the cleaned surfaces in the same atmosphere, to measure a contact angle based on a half-angle ($\theta/2$) method.

<Increase in Hardness>

The hardness of each of the rubber sheets of Examples 1 and 2 before and after the fluorination treatment was measured with a type A durometer in accordance with JIS K 6253-3:2012, and the difference, i.e., the increase in the hardness was then calculated.

<50% Tensile Test>

The rubber sheets of Examples 1 to 2 and Comparative Examples 1 to 4 were stretched by 50%, and the stretching was then released. Thereafter, the surfaces of the rubber sheets were observed with a SEM to check the presence or absence of cracks. If no crack was observed, it was evaluated as A. If any crack was observed, it was evaluated as B.

<Cross-Cut Test>

The rubber sheets of Examples 1 to 2 and Comparative Examples 1 to 4 underwent a cross-cut test in accordance with JIS K 5600-5-6:1999, and the surfaces of the rubber sheets were then visually observed to check the presence or absence of peeling. If no peeling was observed, it was evaluated as A. If any peeling was observed, it was evaluated as B.

(Test Results)

The test results are shown in Table 1.

TABLE 1

|  | Example | | Comparative Example | | | |
| --- | --- | --- | --- | --- | --- | --- |
|  | 1 | 2 | 1 | 2 | 3 | 4 |
| Kind of Rubber | Silicone | Silicone | Silicone | Silicone | Silicone | Silicone |
| Coefficient of Rolling Resistance | 0.015 | 0.017 | 0.047 | 0.025 | 0.016 | 0.019 |
| Reduction Rate % | 68.1 | 63.8 | — | — | — | — |
| Coefficient of Static Friction | 1.35 | 1.09 | 0.51 | 0.25 | 0.26 | 0.20 |
| Increase Rate % | 165 | 114 | — | — | — | — |
| Contact Angle ° | 114 | 120 | 108 | 102 | 109 | 120 |
| Increase in Hardness | +A1 | +A6 | — | — | — | — |
| 50% Tensile Test | A | A | A | B | B | B |
| Cross-Cut Test | A | A | A | A | A | B |

Comparison of Examples 1 and 2 in which the surfaces underwent a fluorination treatment under strict conditions with Comparative Example 1 in which no surface underwent a fluorination treatment based on Table 1 shows that each of Examples 1 and 2 has a lowered coefficient of rolling resistance. This expects the reduction in adhesion to the article. Further, each of Examples 1 and 2 has a raised coefficient of static friction. This expects a high grip performance to the article. Further, it can be seen that water repellency is imparted to Examples 1 and 2. This can expect the reduction in adhesion of slurry used at the time of polishing when Examples 1 and 2 are applied as elastic films for retaining a wafer in a CMP apparatus. It is also demonstrated that the surface modification by the fluorination treatment in Examples 1 and 2 avoids cracking of the surface in the 50% tensile test and avoids generation of foreign matters caused by peeling of the surface layer in the cross-cut test.

The coefficient of rolling resistance of each of Comparative Examples 2 to 4 each having a surface provided with a coating layer was low. However, in Comparative Examples 2 to 4, cracking of the coating layer on each surface was observed in the 50% tensile test, and generation of foreign matters caused by peeling of the coating layer on each surface was observed in the cross-cut test.

INDUSTRIAL APPLICABILITY

The present invention is useful in the technical fields of a silicone rubber molded body and a method for producing the same.

DESCRIPTION OF REFERENCE CHARACTERS

A CMP Apparatus
P POLISHING PAD
S Wafer (Article)
10 Elastic Film (Silicone Rubber Molded Body)
11 Wafer Retaining Surface (Article Contact Surface)

What is claimed is:

1. A silicone rubber molded body having a fluorinated article contact surface, wherein the fluorinated article contact surface has a coefficient of rolling resistance that is lower than a coefficient of rolling resistance of an article contact surface that has not undergone a fluorination treatment,
wherein the silicone rubber molded body is a pad of an article grip in a robot arm.

2. A silicone rubber molded body having a fluorinated article contact surface, wherein the fluorinated article contact surface has a coefficient of rolling resistance that is lower than a coefficient of rolling resistance of an article contact surface that has not undergone a fluorination treatment,
wherein the silicone rubber molded body is a case of a portable electronic device.

3. A method for producing the silicone rubber molded body of claim 1, the method comprising:
performing a fluorination treatment of bringing an article contact surface of a silicone rubber-made, surface-untreated molded body into contact with a surface treating gas containing a fluorine gas and not containing an oxygen gas with a partial pressure of 3.00 kPa or more.

4. A method for producing the silicone rubber molded body of claim 2, the method comprising:
performing a fluorination treatment of bringing an article contact surface of a silicone rubber-made, surface-untreated molded body into contact with a surface treating gas containing a fluorine gas and not containing an oxygen gas with a partial pressure of 3.00 kPa or more.

5. A method for producing a silicone rubber molded body having a fluorinated article contact surface, wherein the silicone rubber molded body is an elastic film for retaining a wafer in a chemical mechanical polishing apparatus, the method comprising:
producing a silicone rubber-made, surface-untreated molded body in a form of an elastic film from an uncrosslinked silicone rubber material by press molding or injection molding, the surface-untreated molded body being made of a crosslinked silicone rubber material; and performing a fluorination treatment of bringing an article contact surface of the surface-untreated molded body in the form of the elastic film into contact with a surface treating gas containing a fluorine gas and not containing an oxygen gas with a partial pressure of the fluorine gas of 3.00 kPa or more and 20.0 kPa or less at a temperature of 0° C. or more to 100° C. or less for a treatment time of 1 minute or more to 60 minutes or less, wherein the surface treating gas comprises 10 vol % or more to 100 vol % or less of the fluorine gas, wherein: a coefficient of rolling resistance of the treated article contact surface is lower than a coefficient of rolling resistance of an article contact surface that has not undergone a fluorination treatment; a coefficient of static friction of the treated article contact surface is higher than a coefficient of static friction of an article contact surface that has not undergone the fluorination treatment; and an increase in hardness of the article contact surface after the fluorination treatment is A10 or less, the hardness being measured with a type A durometer, and wherein the silicone rubber is crosslinked through condensation polymerization.

6. A method for producing a silicone rubber molded body having a fluorinated article contact surface, wherein the silicone rubber molded body is an elastic film for retaining a wafer in a chemical mechanical polishing apparatus, the method comprising:

producing a silicone rubber-made, surface-untreated molded body in a form of an elastic film from an uncrosslinked silicone rubber material by press molding or injection molding, the surface-untreated molded body being made of the silicone rubber material crosslinked using organic peroxide; and performing a fluorination treatment of bringing an article contact surface of the surface-untreated molded body in the form of the elastic film into contact with a surface treating gas containing a fluorine gas and not containing an oxygen gas with a partial pressure of the fluorine gas of 3.00 kPa or more and 20.0 kPa or less at a temperature of 0° C. or more to 100° C. or less for a treatment time of 1 minute or more to 60 minutes or less, wherein the surface treating gas comprises 10 vol % or more to 100 vol % or less of the fluorine gas;

wherein: a coefficient of rolling resistance of the treated article contact surface is lower than a coefficient of rolling resistance of an article contact surface that has not undergone a fluorination treatment; a coefficient of static friction of the treated article contact surface is higher than a coefficient of static friction of an article contact surface that has not undergone the fluorination treatment; and an increase in hardness of the article contact surface after the fluorination treatment is A10 or less, the hardness being measured with a type A durometer, wherein a treatment pressure is 3 kPa or more to 200 kPa or less.

7. A method for producing a silicone rubber molded body having a fluorinated article contact surface, wherein the silicone rubber molded body is an elastic film for retaining a wafer in a chemical mechanical polishing apparatus, the method comprising:

producing a silicone rubber-made, surface-untreated molded body in a form of an elastic film from an uncrosslinked silicone rubber material by press molding or injection molding, the surface-untreated molded body being made of the silicone rubber material crosslinked using organic peroxide; and performing a fluorination treatment of bringing an article contact surface of the surface-untreated molded body in the form of the elastic film into contact with a surface treating gas containing a fluorine gas and not containing an oxygen gas with a partial pressure of the fluorine gas of 3.00 kPa or more and 20.0 kPa or less at a temperature of 0° C. or more to 100° C. or less for a treatment time of 1 minute or more to 10 minutes or less, wherein the surface treating gas comprises 10 vol % or more to 100 vol % or less of the fluorine gas;

wherein: a coefficient of rolling resistance of the treated article contact surface is lower than a coefficient of rolling resistance of an article contact surface that has not undergone a fluorination treatment; a coefficient of static friction of the treated article contact surface is higher than a coefficient of static friction of an article contact surface that has not undergone the fluorination treatment; and an increase in hardness of the article contact surface after the fluorination treatment is A10 or less, the hardness being measured with a type A durometer.

* * * * *